R. H. BLOOMER.
STOCK WATERING DEVICE.
APPLICATION FILED SEPT. 27, 1917.
1,281,758.
Patented Oct. 15, 1918.
2 SHEETS—SHEET 1.
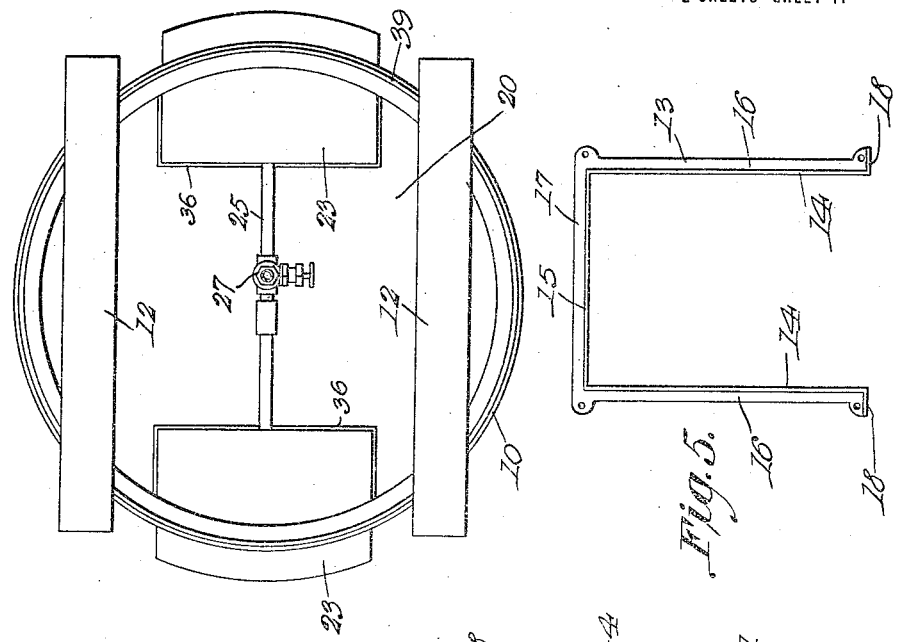
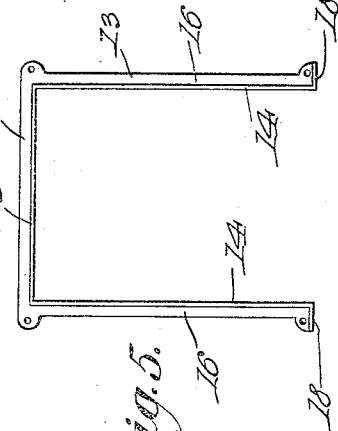
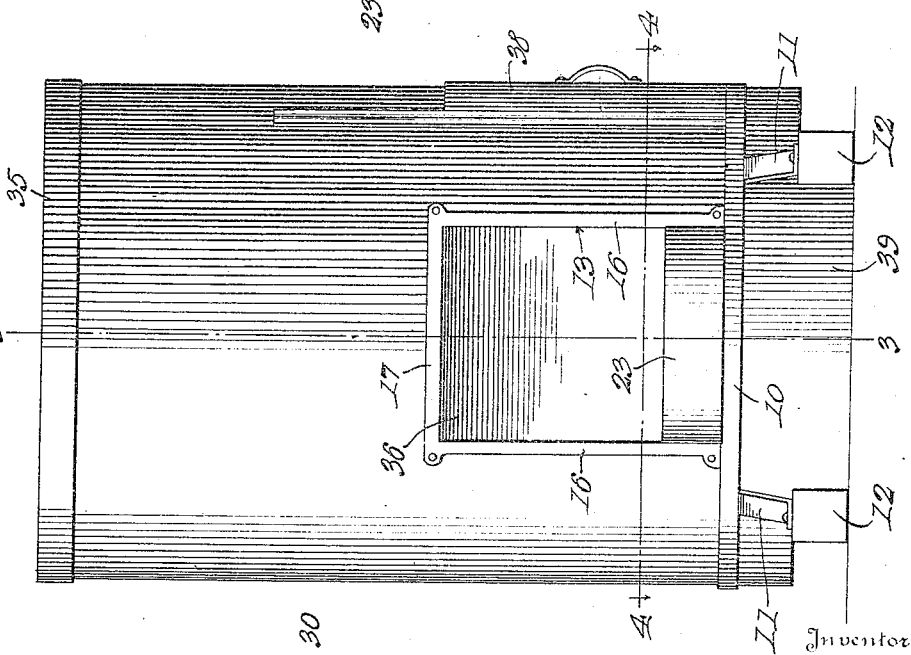
Inventor
R. H. Bloomer
By Milton Bunk
Attorney R. H. BLOOMER.
STOCK WATERING DEVICE.
APPLICATION FILED SEPT. 27, 1917.
1,281,758.
Patented Oct. 15, 1918.
2 SHEETS—SHEET 2.
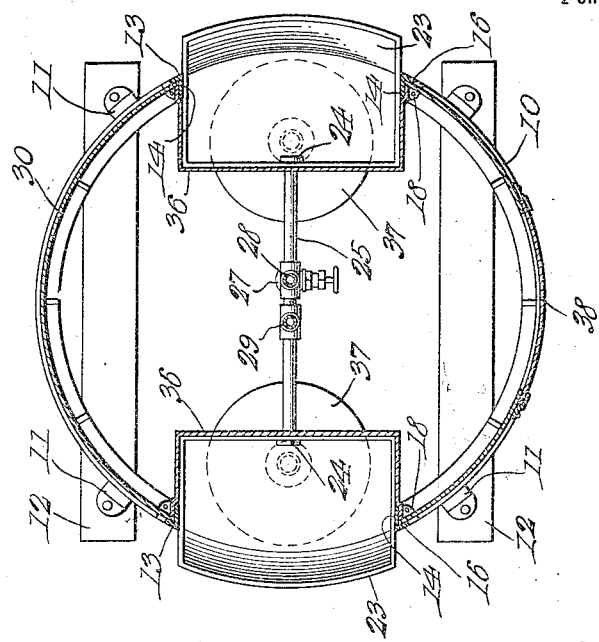
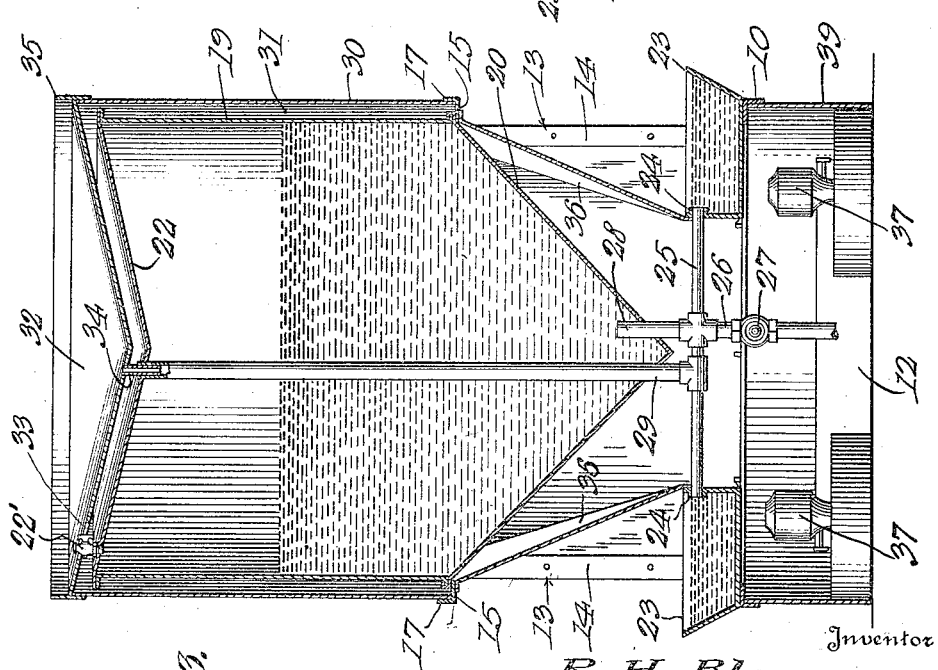
Inventor
R. H. Bloomer
By Milton Buck
Attorney

UNITED STATES PATENT OFFICE.

REUBIN H. BLOOMER, OF COUNCIL BLUFFS, IOWA.

STOCK-WATERING DEVICE.

1,281,758.

Specification of Letters Patent.

Patented Oct. 15, 1918.

Application filed September 27, 1917. Serial No. 193,512.

*To all whom it may concern:*

Be it known that I, REUBIN H. BLOOMER, a citizen of the United States, residing at Council Bluffs, in the county of Pottawattamie and State of Iowa, have invented certain new and useful Improvements in Stock-Watering Devices, of which the following is a specification.

This invention has relation to stock watering devices, and has for an object to provide a device of this character embodying watering troughs, and means for automatically maintaining the level of the water therein at the desired height.

Another object of the invention is to provide a device of this character embodying a reservoir and means for filling the same, whereby the troughs may be supplied from the reservoir; and means for filling the troughs simultaneously when desired, without filling the reservoir.

Another object of the invention is to provide a watering device having the above named characteristics, and constructed in a manner to permit the reservoir and troughs to be heated, whereby to maintain the temperature of the water therewithin above the freezing point during cold weather; and to provide for conservation of the heat of the water within the reservoir.

In addition to the foregoing, this invention comprehends improvements in the details of construction and arrangement of parts to be hereinafter described and particularly set forth in the appended claims.

In the accompanying drawings, in which similar and corresponding parts are designated by the same characters of reference, throughout the several views in which they appear:

Figure 1 is a view in elevation of a stock watering device, constructed in accordance with my invention.

Fig. 2 is a view of the device in bottom plan.

Fig. 3 is a vertical section taken on the line 3—3 of Fig. 1.

Fig. 4 is a horizontal section taken on the line 4—4 of Fig. 1, and

Fig. 5 is a detail view in elevation of a portion of the frame.

With reference to the drawings, 10 indicates an annular member of angle iron, forming the frame of the device and having formed therewith a plurality of depending legs 11. In practice, adjacent legs are supported upon wooden beams 12 which rest upon the ground.

A frame 13 is bolted at diametrically opposite points upon the annular member; and as shown more clearly in Fig. 5, each frame includes vertical bars 14, connected at their upper ends by means of the bar 15, said bars having outwardly extending flanges 16 and 17 formed integrally therewith and with oppositely extending extensions 18 provided at the lower ends of the vertical bars, apertured, whereby to permit the frames to be bolted to the annular frame.

The reservoir is in the nature of a cylindrical container, comprising a vertical wall 19, an acute, inverted cone shaped bottom 20, and a relatively shallow inverted cone shaped top 21, the container being air tight, except for the provision of a pet-cock 22 in the top member of the container, which is however, kept normally closed. The reservoir is supported by resting the lower edge of the vertical wall thereof upon the top bars of the frames 13.

A pair of cast iron troughs 23 are provided, one being located within each of the frames 13 and bolted to the annular frame member, said annular frame member forming a support for the troughs as indicated. The rear wall of each trough is formed with an opening 24, and said openings are connected by means of a fluid conduit 25. A branch 26 having a valve 27 therein is led to a source of water supply, such as a city main; and a second branch 28 is led into the bottom of the reservoir, terminating a short distance thereabove. A third branch 29 is led vertically from the conduit 25, through the reservoir, without communication therewith however, and out through the top 22.

A cylindrical casing 30, open at each end, is encompassed about the device, the lower end resting upon the annular frame, and its upper end extending above the top of the reservoir. The diameter of the casing should be such as to provide an air space 31 between the wall of the casing and the vertical wall of the reservoir. A removable cover 32 is then placed upon the top of the casing. This cover is cone shaped to correspond to the configuration of the top 22 of the reservoir, from which it is spaced to form a dead air space in communication with the space 31 surrounding the reservoir. An opening 33 is provided in the cover to permit of access to the pet-cock; and a spout 34 is provided in the lowest point to fit in the upper end of the vertical pipe 29. A circular flange 35 may be provided at the periphery of the cover, if desired, to prevent the splashing of water during filling of the troughs. A pair of shields 36 are provided, secured to the top edges of the rear and side walls of the troughs, and to the frames 13, thus forming closures as it will be noted that openings are formed at opposite sides of the casing through which the troughs project, the material at the edges of said openings being secured to the frames 13, the flanges thereof being provided for that purpose. A pair of heating elements such as lamps 37 are provided, one disposed beneath each trough, and are inserted in the casing through a sliding door 38 provided to close an opening therein. Annular shields 39 may be utilized to close the space beneath the annular frame member.

In order to fill the water reservoir the exits to the pipes 25 are corked and the pet-cock is opened after which the valve 27 is opened to permit the water to flow through the branch pipe 28, and when a sufficient volume of water is stored in the reservoir the valve 27 and the pet-cock are closed and the corks removed from the pipes 25. Water will flow into the troughs until the level therein rises above the openings 24, said openings being located adjacent the top edges of the troughs. As the water is withdrawn from the troughs, and the level descends to a point below the openings 24, air will enter the said openings and pass into the reservoir through the conduit 25 and the branch 28 thereof to displace a quantity of water sufficient to replace the amount removed from the troughs, thereby maintaining the level therein constant. If the reservoir is empty and it is desired to fill the troughs without filling the reservoir, water is poured into the cover 32 of the casing so that the water descends through the pipe 29 and the conduit 25 into the troughs, thus filling them both at the same time.

It will be apparent that the water in the troughs is heated by applying heat directly to the troughs. This is necessary because the troughs are exposed to the air. The water in the reservoir is heated to a lesser extent by the upward circulation of the heat from the lamps, and to conserve this heat in the water of the reservoir, I provide the dead air space around the same. It will further be noted that by providing a conical bottom for the reservoir, a greater area is exposed to the heated air, thereby utilizing the heat to the greatest extent.

While I have illustrated and described my invention with some degree of particularity, I realize that in practice various alterations therein may be made; and I therefore reserve the right and privilege of changing the form of the details of construction, or otherwise altering the arrangement of the correlated parts without departing from the spirit of the invention or the scope of the appended claims.

Having thus described my invention, what I claim as new and desire to secure by Letters Patent is:

1. A stock watering device, including a plurality of troughs, an air-tight reservoir to supply said troughs by gravity, a conduit connecting said troughs, a branch of said conduit extending into the lower end of the reservoir, a valve controlled branch of said conduit, adapted for connection to a source of water supply, a vertical branch pipe of said conduit, a funnel at the top of said vertical pipe to permit filling of the troughs independently of the reservoir, and a valve controlled vent at the top of the reservoir.

2. A stock watering device, including an air-tight reservoir, a valve controlled vent therefor, a pair of troughs beneath the reservoir, a conduit connecting the troughs, a branch of said conduit extending vertically through the reservoir, a funnel at the top of said branch, a second branch of said conduit leading into the reservoir and terminating at a point adjacent the bottom, and a third valve controlled branch of said conduit for connection to a source of water supply.

3. A stock watering and heating device, including an annular frame member, a pair of inverted U-shaped frames, one mounted at each side of the annular frame, a reservoir mounted on said U-shaped frames, a pair of troughs, one located within each U-shaped frame member, a conduit connecting the troughs, a vertical pipe leading from said conduit and extending through the reservoir, projecting thereabove, a second branch from said conduit leading into the reservoir and terminating at a point slightly above the bottom, a valve controlled inlet for the reservoir, a valve controlled vent therefor, a casing surrounding the reservoir in spaced relation thereto to form a dead air space, said casing having openings through which the troughs project, a funnel shaped cover for the casing having an opening in communication with the vertical pipe, shields around the rear portions of the troughs to form partial closures for the openings of the casing, a door closed opening in the casing, and a pair of heating elements to be placed beneath the troughs.

In testimony whereof I affix my signature in presence of two witnesses.

REUBIN H. BLOOMER.

Witnesses:
J. M. KENNEDY,
INEZ BLOOMER.